United States Patent
Christiansson et al.

(10) Patent No.: US 9,925,903 B2
(45) Date of Patent: Mar. 27, 2018

(54) MULTI-FUNCTIONAL CATERING MODULE FOR ARRANGEMENT IN A VEHICLE

(71) Applicant: VOLVO CAR CORPORATION, Gothenburg (SE)

(72) Inventors: Thomas Christiansson, Askim (SE); Tisha Johnson, Camarillo, CA (US); Todd Levy, Gothenburg (SE); Patrik Lundgren, Torslanda (SE); Axel Ernstsson, Gothenburg (SE); Robin Page, Vastra Frolunda (SE)

(73) Assignee: Volvo Car Corporation, Gothenburg (SE)

( * ) Notice: Subject to any disclaimer, the term of this patent is extended or adjusted under 35 U.S.C. 154(b) by 24 days.

(21) Appl. No.: 15/078,049

(22) Filed: Mar. 23, 2016

(65) Prior Publication Data

US 2016/0288684 A1 Oct. 6, 2016

(30) Foreign Application Priority Data

Apr. 1, 2015 (EP) .................................... 15162221

(51) Int. Cl.
| | |
|---|---|
| *B60N 3/00* | (2006.01) |
| *B60N 3/06* | (2006.01) |
| *B60N 3/10* | (2006.01) |
| *B60N 2/015* | (2006.01) |
| *B60N 2/06* | (2006.01) |
| *B60R 11/02* | (2006.01) |
| *B60R 11/00* | (2006.01) |

(52) U.S. Cl.
CPC .............. *B60N 3/001* (2013.01); *B60N 2/015* (2013.01); *B60N 2/06* (2013.01); *B60N 3/002* (2013.01); *B60N 3/063* (2013.01); *B60N 3/102* (2013.01); *B60N 3/103* (2013.01); *B60R 11/02* (2013.01); *B60R 2011/0029* (2013.01); *B60R 2011/0294* (2013.01)

(58) Field of Classification Search
CPC .......... B60N 2/06; B60N 3/001; B60N 3/002; B60N 3/063; B60N 3/102; B60N 3/103
USPC ....................................... 296/24.34
See application file for complete search history.

(56) References Cited

U.S. PATENT DOCUMENTS

| | | | | |
|---|---|---|---|---|
| 5,338,081 A | * | 8/1994 | Young ...................... | B60R 7/04 224/542 |
| 6,135,549 A | * | 10/2000 | Demick ................. | B60N 3/001 108/44 |

(Continued)

FOREIGN PATENT DOCUMENTS

| | | | | |
|---|---|---|---|---|
| DE | 102004041583 A1 | 3/2006 | | |
| DE | 202008003469 U1 | * 5/2008 | ............. | B60N 3/001 |

(Continued)

OTHER PUBLICATIONS

Extended European Search Report dated Sep. 24, 2015, Application No. 15162221.4-1754, Applicant Volvo Car Corporation, 4 Pages.

*Primary Examiner* — Pinel E Romain
(74) *Attorney, Agent, or Firm* — Brooks Kushman P.C.

(57) ABSTRACT

The disclosure relates to a multi-functional catering module for arrangement in a passenger compartment of a vehicle. The catering module is arranged to be mounted to seat rails of the passenger compartment and arranged to be movable along the seat rails between at least a first user position and a stowage position. The catering module comprises at least one service or entertainment option.

18 Claims, 7 Drawing Sheets

(56) References Cited

U.S. PATENT DOCUMENTS

| | | | | |
|---|---|---|---|---|
| 7,600,811 | B2* | 10/2009 | Park | B60N 3/002 296/37.15 |
| 8,444,196 | B2* | 5/2013 | Arndt | B60R 7/04 296/187.05 |
| 8,894,120 | B2* | 11/2014 | Lechkun | B60N 3/00 296/24.34 |
| 2006/0276065 | A1 | 12/2006 | Hansen et al. | |
| 2011/0012005 | A1* | 1/2011 | Jahner | B60N 2/0806 248/429 |

FOREIGN PATENT DOCUMENTS

| | | |
|---|---|---|
| DE | 102010011086 A1 | 9/2011 |
| FR | 2880597 A1 | 7/2006 |
| GB | 2328651 A | 3/1999 |

\* cited by examiner

MULTI-FUNCTIONAL CATERING MODULE FOR ARRANGEMENT IN A VEHICLE

CROSS-REFERENCE TO RELATED APPLICATIONS

This application claims foreign priority benefits under 35 U.S.C. § 119(a)-(d) to European patent application number EP 15162221.4, filed Apr. 1, 2015, which is incorporated by reference in its entirety.

TECHNICAL FIELD

The disclosure relates to a multi-functional catering module for arrangement in a vehicle. The catering module comprises at least a foot rest surface.

BACKGROUND

In the luxury market for vehicles a number of options for catering to a passenger's need of food, drinks, services and/or entertainment are available. Examples of how this is provided are compartments in the side of the doors, in the back of the front seats or a compartment in the luggage compartment which may be accessible from within the passenger cabin.

One problem that exists with the above described compartments is that they need to be determined with the purchase of the vehicle. In the case of the purchase of a previously used vehicle which does not suit the new owner, entire parts of the interior of the passenger compartments needs to be removed and replaced. This means that once a solution is determined it is at least very expensive to change between catering solutions. Depending on the solution it may be impossible to adapt a previously used vehicle to a new need.

There thus exists a need for improving the flexibility for changing catering solutions in vehicles.

SUMMARY

An object of the present disclosure is to provide an inventive multi-functional catering module for arrangement in a vehicle.

The disclosure relates to a multi-functional catering module for arrangement in a passenger compartment of a vehicle. The catering module is arranged to be mounted to seat rails of the passenger compartment and arranged to be movable along the seat rails between at least a first user position and a stowage position. The catering module comprises at least one service or entertainment option.

With catering module is meant a catering module that caters to a passenger in a vehicle, providing at least one option for a service or entertainment, in some examples a multitude of options for services or entertainment. One advantage with an embodiment according to the disclosure is that it enables the possibility to have a fully functional catering module placed in front of for instance the rear seat passenger to provide for many luxury needs while creating the most spacious environment possible by removing the front passenger seat. This creates an exclusive seating environment for the luxury segment of vehicles. The catering module is of course also available for other segments of vehicles.

The catering module according to the disclosure allows for the replacement of the passenger front seat in a vehicle with two rows of seats or any seat placed on seat rail in the second row in a vehicle with three rows of seat. This can of course be expanded to a vehicle with any number of rows of seat. By placing the catering module on the seat rails, the catering module can be made to move along the length of the seat rails between at least a first user position and a stowage position. By removing a seat, a spacious environment is created for the person sitting behind the catering module. This enables the use of the entire space where the passenger seat was installed to be used for the catering module.

The catering module according to the disclosure in one embodiment comprises a foot rest surface. The fact that the catering module is movably installed on the seat rails means that one catering module easily can cater to users of various lengths.

The vehicle in which the catering module is installed preferably comprises an instrument panel. The catering module may be arranged on the seat rails of the front passenger seat. In the stowage position, at least part of the catering module is placed beneath an instrument panel. When in the stowage position, the catering module is placed as far forward in the passenger compartment as possible. This gives a lot of space between the rear seat and the catering module. This simplifies exit and entry of the vehicle and leads to a spacious feeling of the interior of the passenger compartment.

The catering module may be movable on the seat rails by means of a stepless motor. By using a stepless motor, all of the seat rails can be utilized and the location of the catering module can be adjusted to every need.

The position of the catering module may be controlled by means of a remote control. With a remote control is meant for instance a remote control connected with wire directly to the motor, a wireless remote or a touchpad removably or securely attached to a surface of the vehicle.

Although it is preferable to move the catering module automatically, in one example the catering module can be moved along the seat rails manually, for instance by having mechanical locking means securing the catering module which upon release allows for manual movement of the catering module.

A service or entertainment option of the catering module may comprise a table top. The table top is pivotably arranged on legs, the legs in turn are pivotably attached to the catering module. The legs are arranged to be pivotable from a table top stowage position to a table top user position. In addition to the foot rest surface the catering module may comprise a table top that can be used to place items such as a computer, a plate, a glass, a food tray or any other item that may require a flat surface to function.

The table top may comprise an openable lid for accessing a table top compartment. The table top compartment can be used for storing various items, e.g., a make-up or vanity kit for a woman or man, a computer with accessories or writing material.

A lamp on the inside of the table top compartments may turn on when the lid is opened. At least in the case the table top compartment comprises a make-up or vanity kit, a lighted mirror lights up on opening the lid.

A bottom surface of the table top may comprise a display. The table top may be arranged to be pivotable from the table top user position to a display viewing position. In order to provide entertainment or information services to the user of the catering module, the bottom surface of the table top can comprise a display, e.g., an LCD, LED, OLED, AMOLED or QLED display. In order to access the display the table top can pivot from a table top position to a display viewing position by means of the pivotable attachment of the table top to the legs. The display is connected to the vehicle human-machine interface (HMI) and is arranged to control at least the functions of the vehicle which directly affects the rear seat passenger, such as for instance ventilation settings, chair heating, chair position and music or video selection and settings.

The catering module may comprise a lock box located in a front compartment of the catering module. The lock box is hidden beneath the table top when in table top stowage position. The lock box may comprise a lock which is openable by e.g., a regular key, a key fob or a key card.

A service or entertainment option of the catering module may comprise a rear compartment arranged to hold at least one pair of shoes. The rear compartment may comprise at least one of: a light which turns on when the compartment is opened, a fan, a shoe polish kit, a shoe tree, an ultraviolet light shoe sanitizer, a removable accessories bag. If the catering module comprises a rear compartment, the rear compartment may be used to keep shoes of the passenger fresh during travels. The light helps the passenger to see the shoes in all lighting conditions, the fan may be used to dry the shoes if they have become wet, the shoe polish kit can be used to polish tarnished shoes and the shoe tree can be used to better keep the shape of the shoes. The compartment itself or the shoe trees may comprise an ultraviolet light shoe sanitizer to remove unwanted odors. The removable accessories bag may be a travel kit comprising a sleep mask and compression stockings as well as spare underwear. The accessories bag may also be a toiletries bag comprising for instance a razor kit and deodorant. The travel kit and toiletries bag may be combined in one accessories bag.

A service or entertainment option of the rear compartment lid may comprise a foot rest surface. The foot rest surface functions as a foot rest when the rear compartment lid is in a closed position and as a foot rest and/or leg rest when in an open position. Opening means of the rear compartment lid is arranged to hold the weight of a rear seat passenger's legs when the rear compartment lid is in the open position. In this way the rear compartment lid may functions both as foot rest and a leg rest depending on the passenger's request and the rear seat passenger may choose between different comfortable positions during travel.

The catering module may be replaceably mounted on the rails. One advantage is that the catering module may be arranged to be easily installable and removable from the seat rails. This means that no expensive modifications of the interior of the passenger compartment needs to be made in order to adapt the vehicle to a specific need. For instance, it may sometimes be necessary to have an extra seat. The catering module is thus replaced by a seat. After the extra seat is no longer needed the catering module can be put back in place of the seat. Also, a catering module with a different set-up can replace an existing catering module if the user of the catering module requires different options. For instance, one catering module comprising a make-up/vanity kit in the table top compartment can be replaced by another catering module having writing equipment in its table top compartment.

The disclosure further relates to a vehicle comprising a multi-functional catering module according to the above description. The vehicle may comprise an additional floor which covers the seat rails. The additional floor has the advantage that it covers the seat rails and/or the floor under where the seat was previously installed.

BRIEF DESCRIPTION OF THE DRAWINGS

The various aspects of embodiments herein, including its particular features and advantages, will be readily understood from the following detailed description and the attached drawings.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
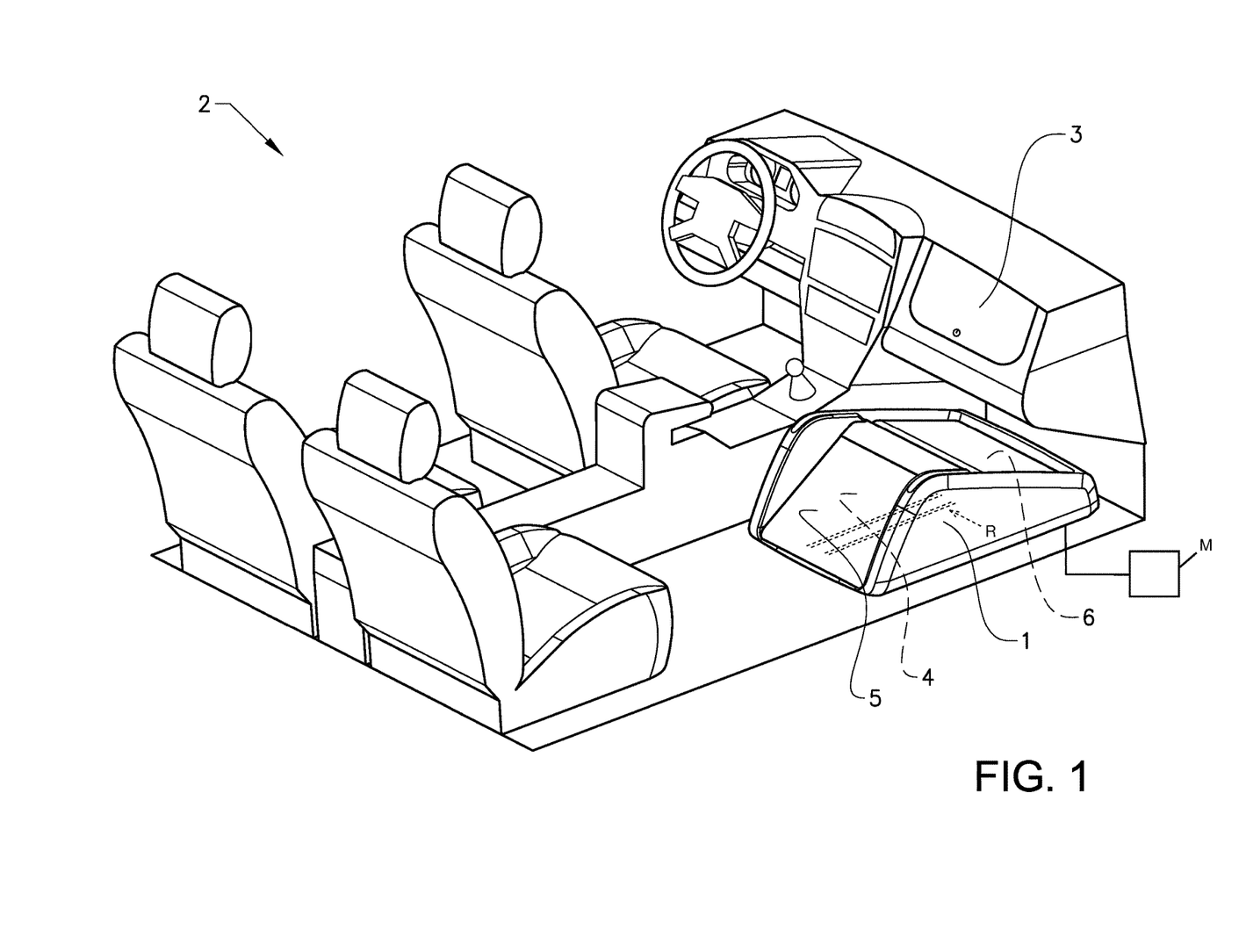
FIG. 1 schematically shows a multi-functional catering module according to the disclosure placed in the interior of a vehicle in a stowage position.

FIG. 1 schematically shows a multi-functional catering module 1 according to the disclosure placed in the interior 2 of a vehicle placed in a stowage position. The catering module 1 is in its stowage position located as far forward on the seat rails R possible with at least a part of the catering module 1 being placed beneath an instrument panel 3. In this position the catering module 1 is out of the way for a passenger entering or exiting the vehicle from a position directly behind the module. The catering module 1 is installed in the vehicle on the front seat rails R using the same type of attachments as a seat is attached to the seat rails R. The attachments or the catering module 1 itself is preferably connected to one or more stepless motor drives M in order for the catering module 1 to be able to move on the seat rails R. The stepless motor or motors M ensure that the catering module 1 can be moved continuously over the length of the seat rails R. In FIG. 1 and all subsequent figures, an additional floor covers at least the seat rails R and the space between the seat rails R in order to provide a more aesthetic appearance.

The catering module 1 comprises as service or entertainment options inter alia a rear compartment 4 comprising a rear compartment lid 5 and a lock box 6. The rear compartment lid 5 can function as a foot rest and/or leg rest. All these features will be described more in detail below.

Figure 2:
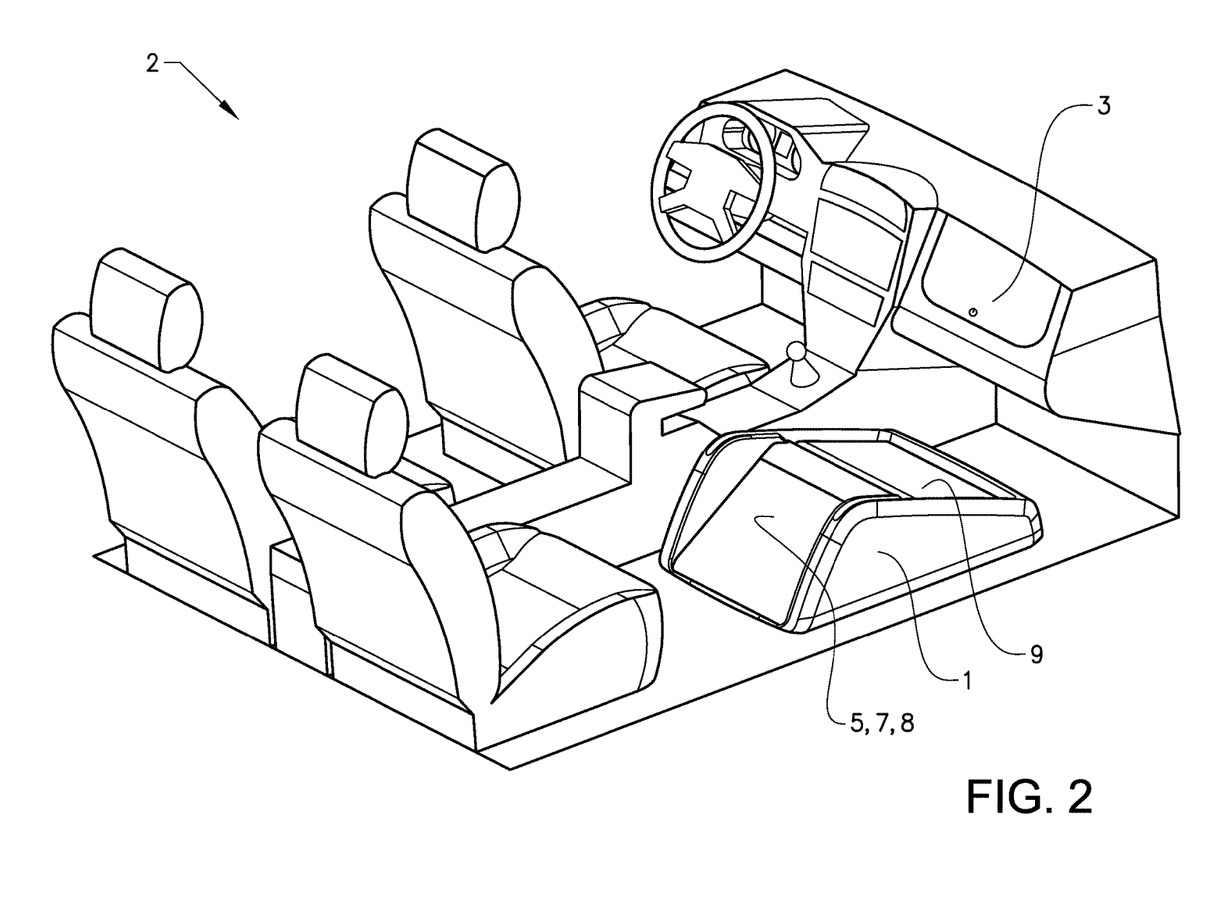
FIG. 2 schematically shows a multi-functional catering module according to the disclosure placed in the interior of a vehicle in a first user position.

FIG. 2 schematically shows a multi-functional catering module 1 according to the disclosure placed in the interior 2 of a vehicle placed in a first user position. In the first user position the catering module is moved towards the rear seat passenger such that a foot rest 7 of the catering module 1 is accessible for the passenger. The foot rest 7 can be made up of a foot rest surface 8 of the rear compartment lid 5 of or an indentation or surface placed on the top part of the catering module 1. The first user position is not a predefined position; each passenger can set the position in accordance with for instance their length and desired inclination of the rear seat in order to get a comfortable seating position for their feet on the foot rest 7. In FIG. 2 a service or entertainment option in the shape of a table top 9 can be seen in a table top stowage position. The table top 9 will be described more in detail below.

Figure 3:
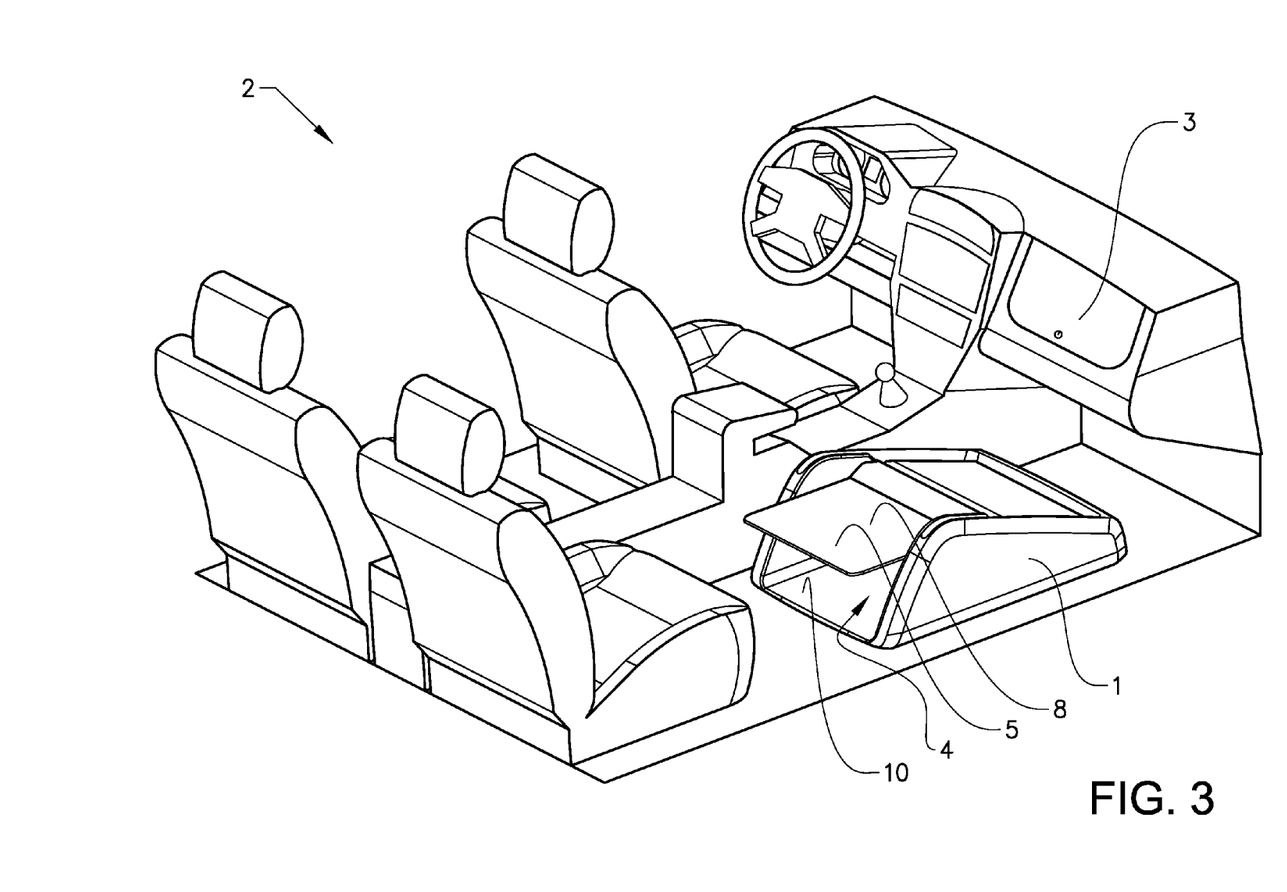
FIG. 3 schematically shows a close-up of a multi-functional catering module according to the disclosure in a first user position with the rear compartment open.

FIG. 3 schematically shows a multi-functional catering module 1 according to the disclosure placed in a first user position with the rear compartment lid 5 open. The rear compartment lid 5 is attached to a catering module base or body of the catering module 1 by means of an opening mechanism or means (not shown). Opening the rear compartment lid 5 allows the rear seat passenger to access a rear compartment 4 in which shoes or similar and a removable accessories bag can be placed. The rear compartment lid 5 which functions as a foot rest when closed, functions as a foot rest and/or leg rest when open depending on the desires of the passenger. The foot rest surface 8 of the lid is in the open position of the rear compartment lid 5 used to support the legs of the passenger and function as a leg rest. The opening means of the lid is arranged to support the weight of the legs of the passenger by using actuators to support the lid as a load bearing surface when in an open position. The lid, i.e., the footrest/leg rest can by this arrangement support at least 18 kilos. The rear compartment 4 comprises an inner compartment surface 10 of the catering module body on which shoes or other footwear (not shown) can be placed. The rear compartment 4 may comprise a number of amenities in order to keep the footwear fresh. Examples of amenities are: a light which turns on when the compartment is opened, a fan to dry the footwear, a shoe polish kit, a shoe tree, and an ultraviolet light shoe sanitizer. A removable accessories bag can also be placed in the rear compartment 4 next to the shoes or in a separate compartment in the rear compartment 4. When using the leg rest, the catering module may be moved to a position different from the first user position in order to provide a suitable position for the passenger's legs.

Figure 4:
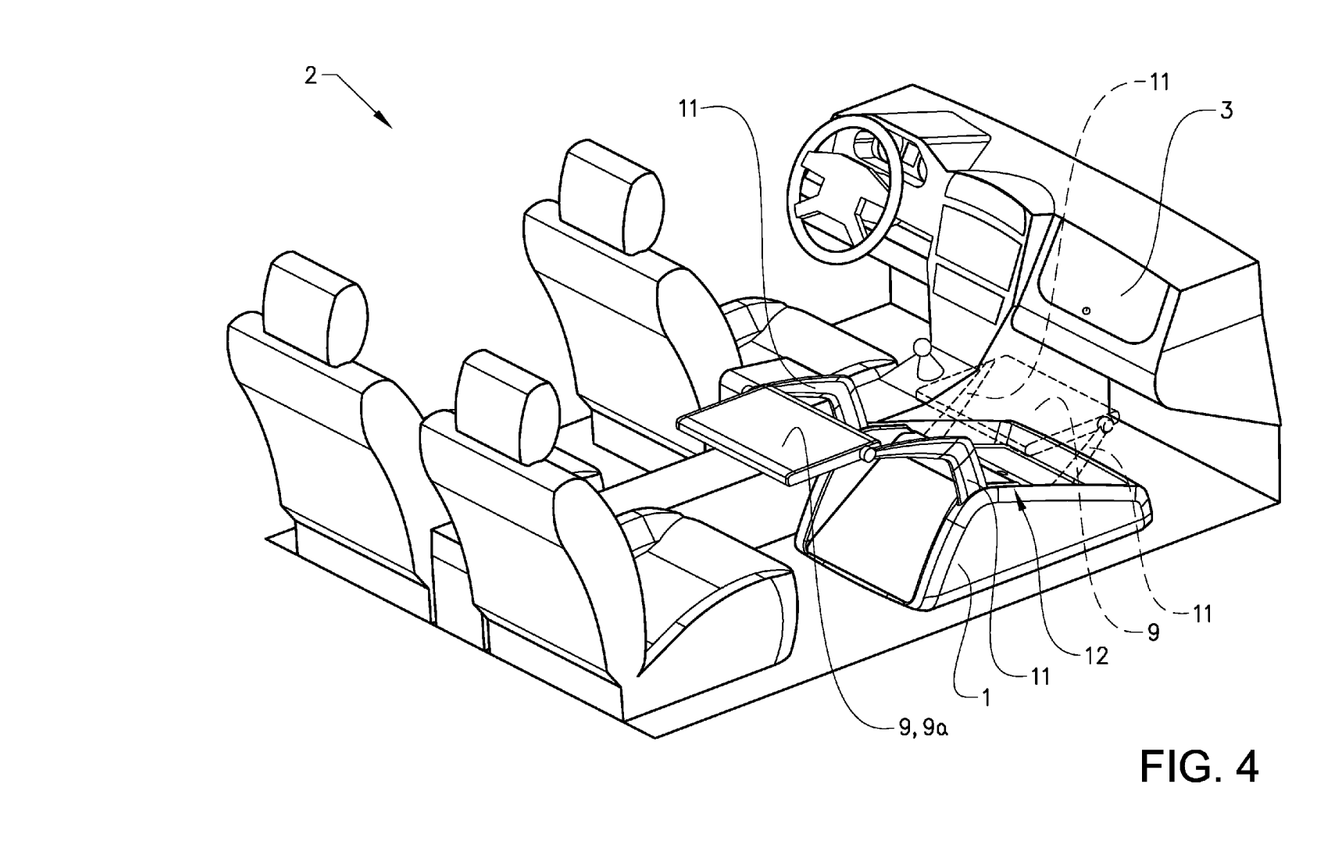
FIG. 4 schematically shows a multi-functional catering module according to the disclosure in a second user position.

FIG. 4 schematically shows a multi-functional catering module 1 according to the disclosure placed in a second user position. In the second user position the catering module 1 is moved to a position such that the passenger may reach a raisable table top 9. The table top 9 is arranged on legs 11 which are stowed when the table top 9 is in a table top stowage position. FIG. 4 shows both a table top user position (shown in solid lines) and an intermediate position (shown in dashed lines) between the table top stowage position and a table top user position. In the table top stowage position, the table top lie against a top surface of a forward part 19 of the catering module 1. The table top 9 in the table top stowage position conceals the top surface of the forward part 19 of the catering module 1 allowing the lock box 6 to be concealed for anyone looking into to the vehicle. The legs 11 are pivotably attached to the catering module body of the catering module 1 and are preferably shaped such that they in the table top stowage position follow the shape of the catering module body and can for instance be stowed in recesses 12 along the sides of the catering module body of the catering module 1. The table top 9 is of such a size that it can hold a standard lap top and a writing pad or note book. The table top comprises a table top surface 9*a* for placing work material such as a laptop or writing material. The table top surface 9*a* can also hold food and/or drinks. In one example the table top is between 400-440 mm by between 280-320 mm. The table top is between 30-50 mm thick. One specific example of dimensions of the table top is 416 mm by 301 mm by 40 mm.

Figure 5:
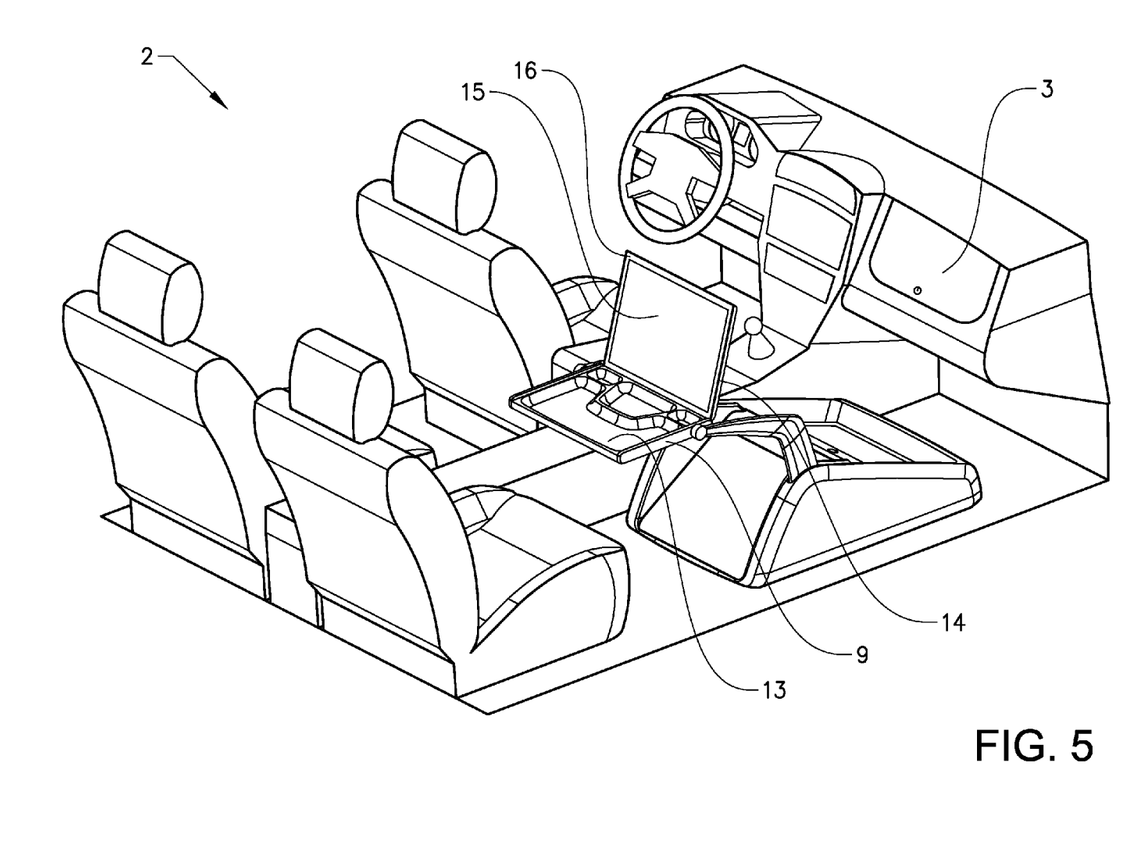
FIG. 5 schematically shows a multi-functional catering module according to the disclosure in a second user position showing an example of a table top compartment.

FIG. 5 schematically shows a multi-functional catering module 1 according to the disclosure placed in a second user position showing an example of a table top compartment 13. The table top 9 can be made to comprise a table top compartment 13 which can be adapted to fit various desired layouts. The table top compartment 13 is accessible by opening a table top lid 14. The table top compartment 13 can be made modular such that an inlay for a woman's vanity kit, comprising powder, a comb, mascara and lip stick, can be replaced with a man's vanity kit or with a writing inlay comprising writing equipment, without having to change the entire table top 9. An inside part 15 of the table top 9 may comprise lighting, such as a lighted frame 16 around whole or part of the inside or single or multiple light sources in the forms of incandescent bulbs, led or halogen. One preferred example is that an entire inside frame of the table top lid 14 is automatically lit up when the table top lid 14 opens up. The table top lid 14 may for instance be opened by pushing or by means of a press button which unlocks the table top lid 14.

Figure 6:
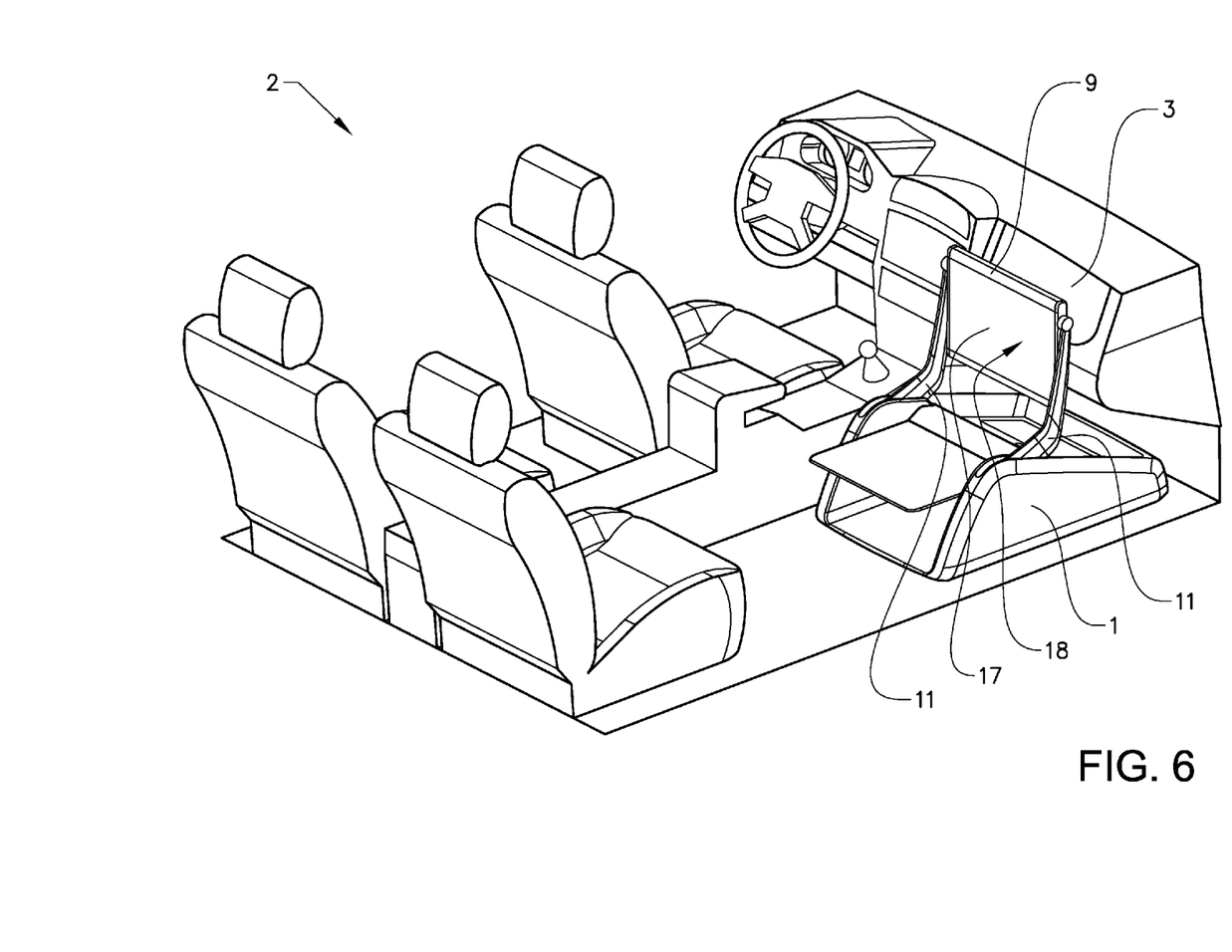
FIG. 6 schematically shows a multi-functional catering module according to the disclosure in a third user position.

FIG. 6 schematically shows a multi-functional catering module 1 according to the disclosure placed in a third user position. In FIG. 6 the table top 9 has been swung round around its pivotable mounting on the legs 11 to present a display 17 placed on a bottom side 18 of the table top 9. The bottom side 18 is located on the opposite side of the table top surface 9*a*. The display 17 is preferably, but not necessarily, connected to the vehicle's human-machine interface (HMI) and the passenger is through the display 17 able to control a variety of functions as described above. The display 17 may be controlled by means of a remote control which can interact with the display 17 and the systems of the vehicle controllable by the passenger. The display 17 can display information such as World Wide Web pages, movies, radio channels and other media suitable for such a display 17. The display 17 can for instance access information by means of the Internet, an internal storage or a portable storage. The display 17 may also be used to display the content of a computer display of a computer connected to the HMI or directly to the display 17. A keyboard is in this case preferably connected to the HMI or the display 17, either by wire or wirelessly. The third user position is a position in which the passenger is comfortable viewing information on the display 17. The catering module 1, in the third user position, can in one example be moved back to a position between the stowage position and the first user position.

Figure 7:
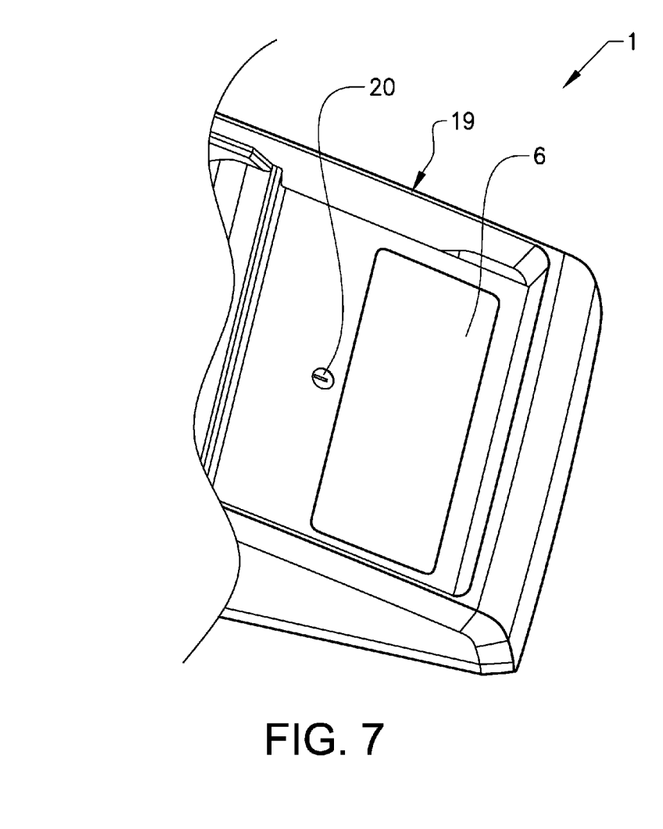
FIG. 7 schematically shows a close-up of a multi-functional catering module according to the disclosure showing the lock box in a closed position.

FIG. 7 schematically shows a close-up of a multi-functional catering module 1 according to the disclosure showing the lock box 6 in a closed position. The lock box 6 is located in the forward part 19 of the catering module body of the catering module 1. The forward part 19 of the catering module 1 is defined as the part of the catering module 1 forward of the rear compartment 4 and rear compartment lid 5. A locking means 20 ensures that the lock box 6 is safely locked. The locking means 20 is openable by means of a standard key; in such case the locking means 20 is visible. The locking means 20 are alternatively openable by means of a key fob, key card or other non-contact means of opening a lock. In such case the locking means may be concealed in order to hide the lock box 6 altogether. In FIG. 7, the catering module 1 is in a position which is not the stowage position. Further, the table top 9 has been moved from the table top stowage position to at least the intermediate position of FIG. 4. The lock box 6 is thereby accessible. When the catering module 1 is in the stowage position, where at least part of the catering module is located beneath the instrument panel 3, the lock box 6 is hidden from view by the instrument panel 3 and a forward door frame.

Figure 8:
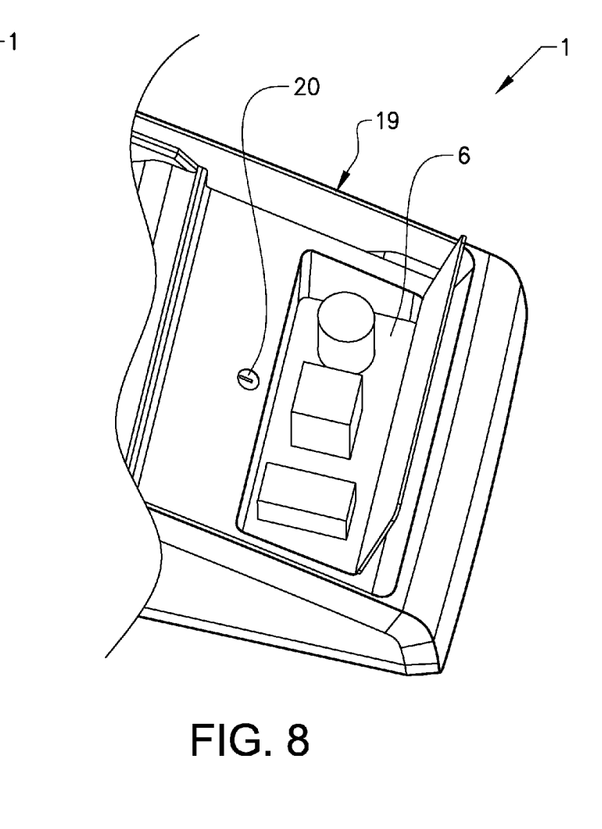
FIG. 8 schematically shows a close-up of a multi-functional catering module according to the disclosure showing the lock box in an open position.

FIG. 8 schematically shows a close-up of a multi-functional catering module 1 according to the disclosure showing the lock box 6 in an open position. The lock box 6 may for instance comprise one big lock box compartment or several smaller ones.

In the figures, the catering module 1 is placed on the right hand side of the vehicle interior 2. It is also possible for the catering module 1 to be placed on the left hand side in case the vehicle is right-hand driven. The different user positions are not set positions. Each passenger can set the positions of the catering module 1 and table top 9 in accordance with for instance their length and desired inclination of the rear seat in order to get a comfortable seating position for their feet on the foot rest 7 as well as desired working position for the table top 9 and desired viewing position for the display 17.

Reference signs mentioned in the claims should not be seen as limiting the extent of the matter protected by the claims, and their sole function is to make claims easier to understand.

As will be realized, embodiments according to the disclosure are capable of modification in various obvious respects, all without departing from the scope of the appended claims. Accordingly, the drawings and the description are to be regarded as illustrative in nature, and not restrictive.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A multi-functional catering module for arrangement in a passenger compartment of a vehicle, the catering module comprising:
    at least one service or entertainment option;
    wherein the catering module is replaceably mountable to seat rails of the passenger compartment so as to be movable along the seat rails between at least a first user position and a stowage position.

2. The multi-functional catering module according to claim 1 wherein the vehicle comprises an instrument panel, and wherein the catering module is mountable on the seat rails of a front passenger seat such that, in the stowage position, at least part of the catering module is located beneath the instrument panel.

3. The multi-functional catering module according to claim 1 wherein the catering module is movable on the seat rails by means of a stepless motor.

4. The multi-functional catering module according to claim 3 wherein position of the catering module is controllable by means of a remote control.

5. The multi-functional catering module according to claim 1 wherein the at least one service or entertainment option of the catering module comprises a table top, the table top being pivotably arranged on legs, wherein the legs are pivotably attached to a catering module body of the catering module, the legs being arranged to be pivotable from a table top stowage position to a table top user position.

6. The multi-functional catering module according to claim 5 wherein the table top comprises a table top lid for accessing a table top compartment.

7. The multi-functional catering module according to claim 6 further comprising a lamp on the inside of the table top compartment that turns on when the table top lid is opened.

8. The multi-functional catering module according to claim 5 wherein a bottom surface of the table top comprises a display, wherein the table top is arranged to be pivotable from the table top user position to a display viewing position.

9. The multi-functional catering module according to claim 1 wherein the at least one service or entertainment option of the catering module comprises a lock box located in a front compartment of the catering module.

10. The multi-functional catering module according to claim 9 wherein the at least one service or entertainment option of the catering module further comprises a table top movably attached to a catering module body of the catering module such that the table top is movable between a table top stowage position and a table top user position, wherein the lock box is hidden beneath the table top when the table top is in the table top stowage position.

11. The multi-functional catering module according to claim 1 wherein the at least one service or entertainment option of the catering module comprises a rear compartment arranged to hold at least one pair of shoes, the rear compartment being accessible by opening a rear compartment lid.

12. The multi-functional catering module according to claim 11 wherein the rear compartment comprises at least one of: a light that turns on when the compartment is opened, a fan, a shoe polish kit, a shoe tree, an ultraviolet light shoe sanitizer, a removable accessories bag.

13. The multi-functional catering module according to claim 11 wherein the rear compartment lid comprises a foot rest surface, the foot rest surface functioning as a foot rest when the rear compartment lid is in a closed position and as a leg rest when in an open position, wherein the rear compartment lid is configured to hold weight of a rear seat passenger's legs when the rear compartment lid is in the open position.

14. A vehicle comprising a multi-functional catering module arranged in a passenger compartment of the vehicle, the catering module including at least one service or entertainment option, wherein the catering module is replaceably mountable to seat rails of the passenger compartment so as to be movable along the seat rails between at least a first user position and a stowage position.

15. The vehicle according to claim 14 further comprising an additional floor that covers the seat rails.

16. A multi-functional catering module for arrangement in a passenger compartment of a vehicle, the catering module comprising:
    a catering module body mountable to seat rails of the passenger compartment so as to be movable along the seat rails between at least a first user position and a stowage position; and
    at least one service or entertainment option associated with the catering module body.

17. The multi-functional catering module according to claim 16 wherein the at least one service or entertainment option of the catering module comprises a table top movably attached to the catering module body such that the table top is movable between a table top stowage position and a table top user position.

18. The multi-functional catering module according to claim 17 further comprising legs pivotally attached to the catering module body, wherein the table top is pivotally arranged on the legs and the legs are pivotable to move the table top between the table top stowage position and the table top user position.

* * * * *